United States Patent [19]

de Waal

[11] 4,418,880

[45] Dec. 6, 1983

[54] FLUID FLOW AUGMENTOR

[76] Inventor: J. F. de Waal, 4 Nicol St., Ottawa, Ontario, Canada, K1J 8A5

[21] Appl. No.: 325,118

[22] Filed: Nov. 27, 1981

[51] Int. Cl.³ .................... B64C 23/06; B63H 13/00
[52] U.S. Cl. ............................. 244/199; 244/12.1;
  244/23 A; 244/53 B; 440/8; 416/191;
  239/127.3; 239/265.11
[58] Field of Search .................... 415/2 A–4 A;
  244/199, 53 B, 73 B, 58, 12.1, 12.3, 23 B, 23 A;
  60/264, 751, 689; 290/44, 54, 55; 181/210, 213;
  440/8; 416/23, 177, 191; 239/127.3, 265.11

[56] References Cited

U.S. PATENT DOCUMENTS

| | | | |
|---|---|---|---|
| 1,510,607 | 10/1924 | Polk .................................... | 244/12.1 |
| 1,519,447 | 12/1924 | Fortier-Beaulieu . | |
| 1,650,702 | 11/1927 | Folmer .................................. | 440/8 |
| 3,121,545 | 2/1964 | Meletiou ............................. | 244/53 B |
| 3,293,852 | 12/1966 | Galli et al. ............................. | 60/264 |
| 3,335,976 | 8/1967 | Kappus ................................ | 244/12.3 |
| 4,070,131 | 1/1978 | Yen ........................................ | 415/3 |
| 4,142,822 | 3/1979 | Herbert et al. ......................... | 415/2 |
| 4,236,866 | 12/1980 | Martinez .............................. | 415/2 R |
| 4,260,325 | 4/1981 | Lymara ................................. | 415/2 R |
| 4,269,563 | 5/1981 | Sharak et al. ......................... | 415/2 R |
| 4,318,019 | 3/1982 | Teasley et al. .................... | 290/44 X |

FOREIGN PATENT DOCUMENTS 557862  8/1923  France ................................ 415/3 R Primary Examiner—Galen L. Barefoot
Assistant Examiner—Rodney Corl
Attorney, Agent, or Firm—Wenderoth, Lind & Ponack

[57] ABSTRACT

There is described a fluid flow concentrating device suitable, for example, for concentrating the flow of tidal waters or of wind, which comprises a hollow body closed at one end and open at the other. The body has a fixed circumferential wall composed of a plurality of fixed spaced vanes and a nozzle located at the open end of the wall. Fluid moving from outside the device through the vanes to the inside of the body creates a vortex within the body and a fluid flow axially of the body through the nozzle. In certain preferred embodiments a turbine is located for rotation in a direction opposite to the direction of rotation of the vortex about a vertical axis, centrally within the nozzle downstream of the fluid flow. The turbine can be used to drive a generator or a motor to, for example, propel a marine craft, or, the augmentor can be used on a aircraft to assist the lift of a wing, or, in another application, can be used with a jet turbine engine to improve both the intake to and the thrust from the engine.

24 Claims, 9 Drawing Figures

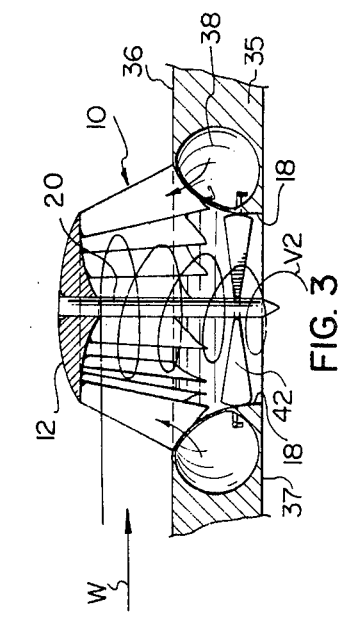
FIG. 1
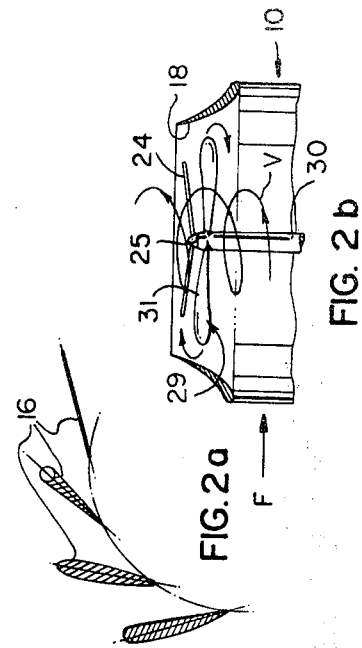
FIG. 3
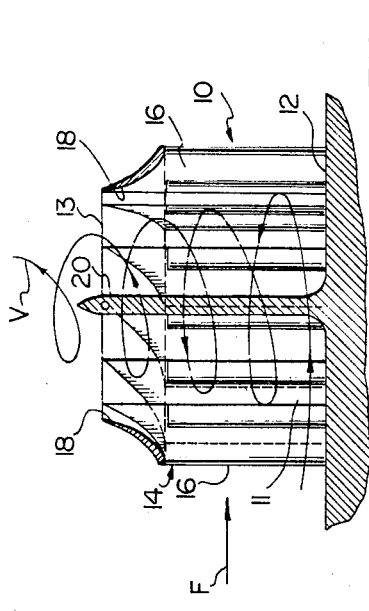
FIG. 2
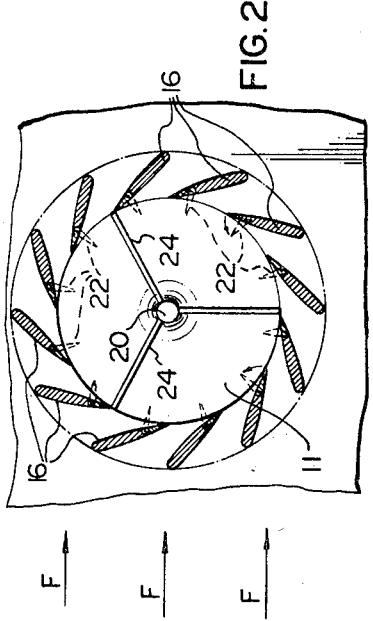
FIG. 2a
FIG. 2b

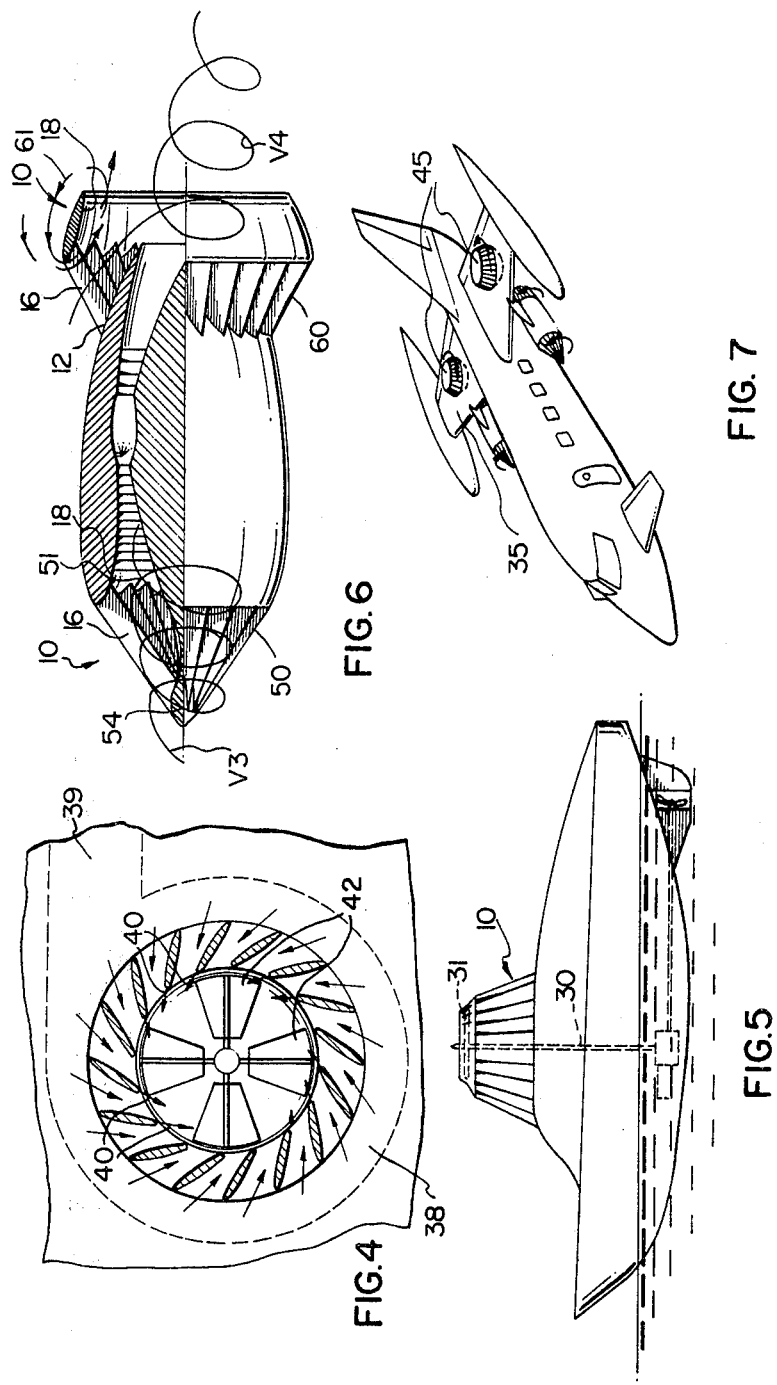

FLUID FLOW AUGMENTOR

BACKGROUND OF THE INVENTION

The present invention is concerned with fluid flow concentrating devices and in one of its aspects with a wind concentrating device in the form of a vortex generator of the tornado-type.

It is known from U.S. Pat. No. 4,070,131 to provide a device in which atmospheric wind is admitted into a vertically extending open ended structure which is spaced from the ground or connected to a subterranean ram-air tunnel. The admitted wind is directed against the interior curved surface of the structure and provides a vortex flow and this flow provides a corresponding low pressure core which draws the air into the bottom of the structure to drive a horizontal turbine. Other fluid flow devices of the prior art are to be seen in U.S. Pat. Nos. 4,236,866; 4,142,822; 4,269,563; 4,260,325 and 1,519,447. Other wind augmentation types of devices are also in experimental use, these fall broadly into the categories of "duct augmentor turbines" and "tip vane turbines". The devices of the prior art have been useful for particular applications but are limited in their scope of application.

SUMMARY OF THE INVENTION

The present invention seeks to provide a fluid flow concentrator which will have a wide versatility of application.

According to the present invention there is provided a fluid flow concentrating device comprising a substantially hollow body closed at one end and open at the other, the body having a fixed circumferential wall means composed of a plurality of fixed spaced vanes and a nozzle located at the open end of the wall means, whereby fluid moving from outside the device through the vanes to the inside of said body, creates a vortex within the hollow body and a fluid flow axially of the body through the nozzle.

In a preferred form of the device the vanes are substantially equally spaced circumferentially and maybe of aerofoil cross-section.

In one preferred embodiment of the invention an axially extending vortex stabilizing column is arranged substantially centrally of the hollow body and may extend through the nozzle. If desired, the column may be provided with a plurality of brace members extending radially outwardly of the column within the substantially hollow body.

The vanes may conveniently be provided with trailing edge fluid flow modifiers which may be flap-like elements.

In a preferred construction a turbine is mounted for rotation, in the direction opposite to the direction of rotation of the vortex, centrally within the nozzle, about a vertical axis. The blades of the turbine may conveniently be located within the nozzle.

In one application of the device according to the present invention the hollow body may be located on an airborne craft with the open end of the body being normally directed in the direction of the ground, in this application the fluid may be, at least in part, a hot gas, a toroidal duct conveniently maybe arranged in the craft adjacent to the nozzle so as to blow the hot gas into the hollow body through the vanes which in this instance would be hollow.

In another application of the device, the hollow body may be mounted externally at the intake of a jet engine, the circumferential wall means providing a pointed cone shape structure extending forwardly of the engine intake, point forward. In this construction the vanes, may be twisted and/or tapered.

According to another application of the present invention the hollow body may be mounted on a marine vessel with the open end of the body being normally directed upwardly; conveniently a turbine shaft may be provided within the body centrally and axially thereof and may carry radially extending turbine blades within the nozzle for rotation in a direction opposite to the direction of rotation of the generated vortex, the end of the turbine shaft remote from the blades may be connected for, say, propulsion of the vessel, for example by mechanical or electrical means.

DESCRIPTION OF THE DRAWINGS

The following is a description by way of example of certain embodiments of the present invention reference being had to the accompanying drawings in which:

FIG. 1 is a schematic representation partly in section of a fluid flow concentrating device;

FIG. 2 is a plan view of the device of FIG. 1;

FIG. 2a, is a detail of various vane cross-section configurations;

FIG. 2b is a schematic representation similar to FIG. 1 but including a turbine.

FIG. 3 is a schematic representation, partially in section of an application to augment the lift of an aircraft wing;

FIG. 4 is a plan view in part section of the device of FIG. 3;

FIG. 5 is a schematic representation of a marine application;

FIG. 6 is a schematic representation of an application as an intake augmentor and a thrust augmentor for a jet engine; and FIG. 7 is a schematic representation of the application of the device in accordance with FIGS. 3 and 6 to an aircraft.

DETAILED DESCRIPTION OF PREFERRED EMBODIMENTS

Referring now to drawings in which like parts have been given like numbers. A fluid flow concentrating device 10 comprises a substantially hollow boddy 11 closed at one end 12 and open at the other 13. The body has a fixed circumferential wall 14 composed of a plurality of fixed substantially equally spaced vaanes 16 and a nozzle 18 located at the open end 13 of the wall 14. As shown the vertical axis is normal to the direction of fluid flow F and wherever practical, the portion of the device 10 will be selected so that its axis is normal to the fluid flow. Fluid moving from outside the wall 14 through the vanes 16 to the inside of the body creates a vortex V within the hollow body 11 and a fluid flow axially of the body 11, outwardly through the diffuser channel 18. A vortex stabilizing column 20 may be provided axially of the hollow body and centrally thereof. In order to get highly efficient use of the vortex, the vane angle should preferably be about 45° with the radius, further the height to diameter ratio of the throat of the nozzle 18 should preferably be near unity as can be seen in FIG. 1.

The vanes 16 may be of aerofoil cross-section as in FIG. 2a or may be of other suitable shapes for example, as also shown in FIG. 2a. The vanes 16 may be provided with fluid flow modifiers, as seen in FIG. 2 as flaps 22 hinged to the trailing edge of the vanes 16.

As seen in FIG. 2 the stabilizing column 20 may be provided with a plurality of brace members 24 extending radially outwardly from the column 20 within the hollow body and connected at the outer edges to the nozzle 18.

In one preferred application, see FIG. 2b, the augmentor of FIG. 1 is modified to incorporate a turbine 29 mounted on a centrally located, axially extending, turbine shaft 30. Turbine blades 31 are housed within the nozzle 18 and provide a particularly safe and compact configuration. By placing the turbine 29 downstream of the vortex V the advantage is achieved that the energy in the axial exhaust flow, rather than in the vortex itself, is used. The design of the turbine blades is selected in accordance with accepted engineering procedures, such that the turbine blades 31 are driven in a direction opposite to the direction of rotation of the vortex V and thus the turbine does not diminish the vortex V. The turbine shaft 30, is supported inside the nozzle 18 by bearing in hub 25 with brace members 24. The opposite end of the shaft, is connected to a device for power utilization say an electric generator located outside the closed end 12.

The fluid flow concentrating device 10 as described with respect to FIGS. 1, 2, 2a, and 2b is suitable for use in a wide variety of applications. It can be used as a device to augment wind velocites, which may in turn be used to drive an air turbine or it may be used hydraulically, say, in a tidal situation, or low-head hydro power generation. In a tidal situation the incoming tide F would act to enter the vanes 16 in the same fashion as a wind and create a whirlpool which could be used in any suitable fashion, for example to drive a hydraulic turbine in opposite direction to the whirlpool.

Turning now to FIG. 3 which shows, together with FIG. 4, the arrangement of the device in an airborne craft as a lift augmentor for the wing of an aircraft. Here the concentrating device 10 is mounted on top of the aircraft wing 35 with the closed end 12 of the body spaced from the upper surface 36 of the wing by the vanes 16. In this preferred configuration, the vanes 16 form a substantially frustoconical structure, narrower at the top than at the base. The vanes maybe twisted and/or tapered. The nozzle 18 is arranged within the wing itself and communicates with the underside 37 of the wing.

As the aircraft moves through the air, a wind W is created and this passes through the vanes 16 and produces a vortex $V_2$ which provides a downwardly directed airflow to augment the lift of the wing: The air entering the device 10 can be controlled by means of trailing edge flaps in the vanes 16 as in FIG. 2. If required, for say, a VTOL application, a toroidal shaped duct 38 is located around the nozzle 18 and is provided with hot gases from the aircraft propulsion engines through a duct 39. The hot gases entering the duct 38 from the duct 39, pass around the duct 38 into the vanes 16, which in this configuration are hollow, and are blown through nozzles at the trailing edge of the vanes 16 (see arrows 40 in FIG. 4) to produce the vortex in the device 10. The resultant thrust from the hollow body 11 through the nozzle 18 may be controlled by butterfly valves 42, suitably mounted in the nozzle 18 on the stabilizer column 20.

FIG. 7 shows the arrangement of the lift augmentor as seen in FIGS. 3 and 4, in an aircraft at 45, that is to say, near the wing tips and generating trailing vortices which rotate in the same sense as the wing tip trailing vortices.

FIG. 5 shows the application of the device 10 as a wind augmentor to drive a turbine 31, the shaft 30 of which is connected to some suitable power takeoff, for example, an electrical generator, which in turn can drive an electric motor to propel the watercraft.

FIG. 6 shows the application of the device 10 in two fashions to a jet engine. The intake augmentor 50 is mounted externally at the intake 51 of a jet engine and the circumferential wall 14 extends forwardly of the engine intake, the vanes 16 providing a conical configuration, closed at one end by the point 54. In this instance, since the wall 14 is not cylindrical, the vanes 16 advantageously may be twisted and/or tapered, preferably from the nose inwardly. The twist conveniently maybe in accordance with the hyperbolic rule, that is to say they are twisted in a fashion such that the product of the tangent of the vane incidence angle with the conical surface and the radius is constant. The air taken in through the vanes 16 creates a vortex $V_3$ and improves the efficiency of the engine intake, by increasing the velocity of the intake air. The nozzle 18 is shaped so as to provide a smooth flow into the intake of the engine. The cone shape of the augmentor 50 additionally inhibits bird ingestion.

At the exhaust end of the jet engine the engine body itself provides the closed end 12 to the device 10 arranged as a thrust augmentor 60, vanes 16 conveniently being, as in the case of the intake augmentor, twisted in accordance with the hyperbolic rule, and/or tapered and once again the nozzle 18 at the open end of the concentrator 10 provides for the escape of exhaust gases from the jet engine. External air passing through the vanes 16 creates a vortex $V_4$ which improves the performance of the engine and this vortex is stabilized by the jet flow itself. That is to say the convergent mixing flow induced by the free jet on passing through the augmentor 60 causes a reduction in pressure around the jet thereby increasing the jet velocity and the jet thrust. The subsequent increase of the mixing flow, strengthens the axial vortex and produces a ring vortex 61 which further augments the thrust. Yet a further augmentation of the thrust results from the increased entropy of the mixing flow by the hot jet gases through convection and radiation.

In FIG. 7 the fashion of mounting the devices of FIG. 6 on an aircraft is illustrated.

It will be understood that the thrust augmentor 60 could also be used to augment the thrust from a rocket engine when operating in the atmosphere in a manner similar to its use with a jet engine.

What I claim as my invention is:

1. A fluid flow concentrating device comprising a substantially hollow body substantially closed at one end and open at the other, an axially extending vortex stabilizing column arranged substantially centrally of the hollow body, the body having a fixed circumferential wall means composed of a plurality of fixed spaced vanes and a nozzle located at the open end of said wall means, whereby fluid moving from outside the device substantially radially through said vanes to the inside of said body, creates a vortex within said hollow body and a fluid flow axially of said body through said nozzle.

2. A device as claimed in claim 1 in which said vanes are substantially equally spaced circumferentially.

3. A device as claimed in claim 1 in which said vanes are of aerofoil cross-section.

4. A device as claimed in claim 1 in which the stabilizing column extends through the nozzle.

5. A device as claimed in claim 1 or claim 5 in which said column is provided with a plurality of brace members extending radially outwardly of the column within the substantially hollow body.

6. A device as claimed in claim 1 or claim 2 or claim 3 in which the vanes are provided with fluid flow modifiers extending along the trailing edges of said vanes.

7. A device according to claim 1 or claim 2 or claim 3 further comprising a turbine located for rotation, in a direction opposite to the direction of rotation of said vortex, about a vertical axis, centrally within the nozzle downstream of the fluid flow.

8. A device as claimed in claim 1 in which the column is a turbine shaft and carries, adjacent an outer end, radially extending turbine blades mounted for rotation, downstream of the fluid flow, centrally of the device about a vertical axis within the nozzle in a direction opposite to the direction of rotation of the vortex.

9. A device as claimed in claim 1 in which hollow body is located on an airborne craft with said open end being normally directed in the direction of the ground.

10. A device as claimed in claim 1 in which hollow body is located on an airborne craft with open end being normally directed in the direction of the ground and said fluid is at least in part a hot gas, a toroidal duct being provided in said craft adjacent said nozzle and arranged to blow said hot gas into said hollow body through said vanes.

11. A device as claimed in claim 1 in which said hollow body is mounted on top of an aircraft wing with said closed end of the body spaced from the upper surface of said wing by said vanes and forming a substantially frustoconical structure narrower at the top than at the base and in which said fluid is at least in part of a hot gas, said nozzle being arranged within the wing and communicating with the underside thereof, a toroidal shaped duct being provided in said aircraft wing surrounding said nozzle and being arranged to blow said hot gas through said vanes into said hollow body, whereby to provide an axial flow of gas substantially vertically downwardly of the underside of said wing.

12. A device as claimed in claim 1 in which said hollow body is mounted on a marine vessel with said open end being normally directed upwardly, a turbine shaft being provided within said body centrally and axially thereof, and carrying radially extending turbine blades within said nozzle for rotation in a direction opposite to the direction of the rotation of the generated vortex, the end of said turbine shaft remote from said blades being connected for power utilization.

13. A device as claimed in claim 1 in which said vanes are provided, at their trailing edges with a flow modifying means.

14. A device as claimed in claim 13 in which said flow modifying means are flap elements.

15. A device as claimed in claim 13 in which said flow modifying means are straight nozzles along said trailing edges of the vanes.

16. A device as claimed in claim 1 in which said hollow body is mounted on top of an aircraft wing with said closed end of said body spaced from the upper surface of said wing by said vanes, said nozzle being arranged within the wing and communicating with the underside thereof, and an axially extending column arranged centrally of the hollow body and mounting, adjacent its outer end, within said nozzle, a butterfly control valve means for throttling the nozzle.

17. A device as claimed in claim 16 in which said vanes form a substantially frusto-conical structure narrower at the top than at the base.

18. A device as claimed in claim 1 in which said hollow body is mounted at the trailing end of one of a jet and rocket engine with the nozzle downstream of the jet and the body being closed at one end by the engine, said vanes being twisted.

19. A device as claimed in claim 18 in which the vanes are tapered having a larger chord dimension at one end than at the other end.

20. A device as claimed in claim 1 in which said hollow body is mounted at the trailing end of one of a jet and a rocket engine with the nozzle downstream of the jet and the body being closed at one end by the engine, said vanes being tapered having a larger chord dimension at one end than at the other end.

21. A fluid flow concentrating device as claimed in claim 1 in which the overall height to diameter ratio of the nozzle is near unity.

22. A fluid flow concentrating device comprising a substantially hollow body of conical configuration mounted externally at the intake of a jet engine, said body being closed at one end at a point and open at the other, the body having a fixed circumferential wall means extending forwardly of the engine intake, point forward, and being composed of a plurality of fixed space vanes and a nozzle located at the open end of the wall means, whereby fluid moving from outside the device through said vanes to the inside of said body creates a vortex within said hollow body and a fluid flow axially of said body through said nozzle.

23. A device as claimed as in claim 22 in which said vanes are tapered.

24. A device as claimed in claim 22 in which the vanes are twisted.

* * * * *